Dec. 19, 1939.    P. H. BATTEN    2,184,135
CLUTCH MECHANISM
Filed Jan. 21, 1938    3 Sheets-Sheet 1

Inventor:
Percy H. Batten
by Davis, Lindsey, Smith & Shonts
Attys.

Dec. 19, 1939. P. H. BATTEN 2,184,135
CLUTCH MECHANISM
Filed Jan. 21, 1938 3 Sheets-Sheet 2
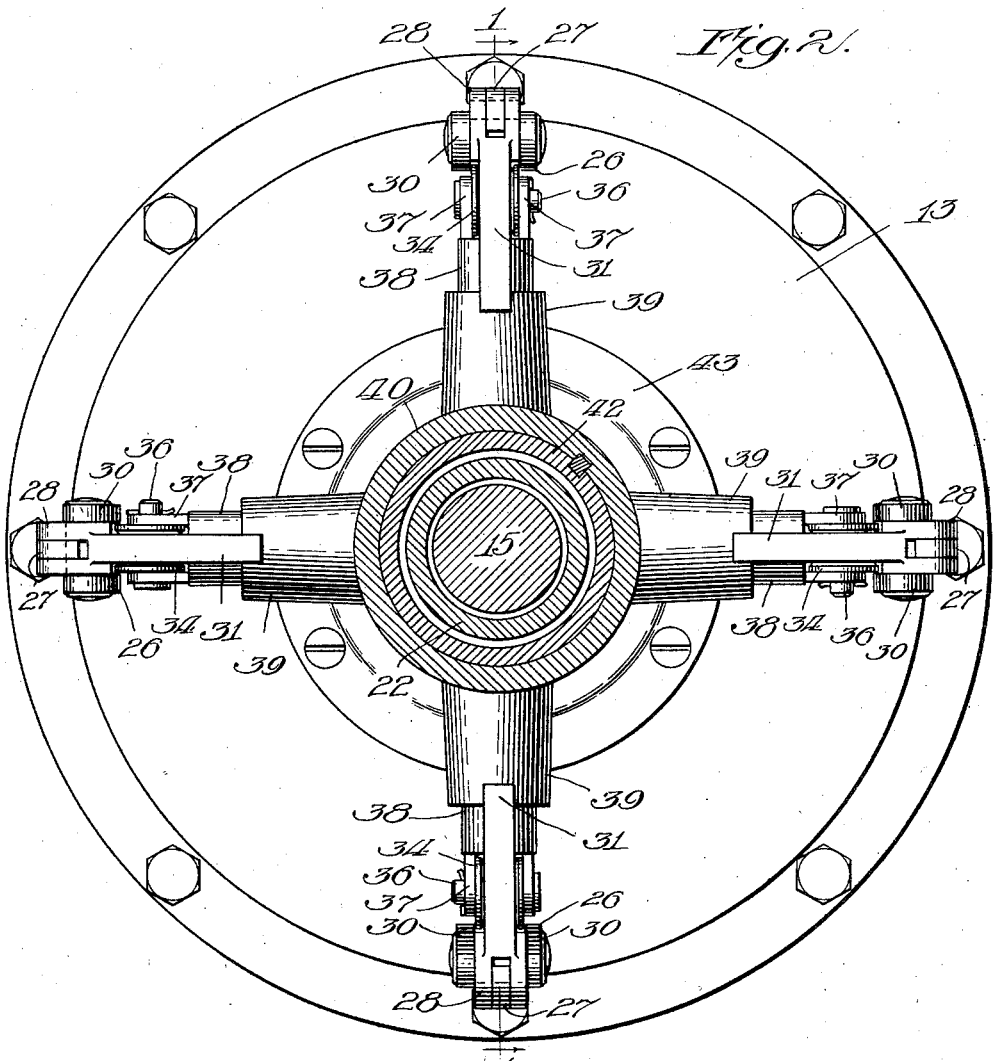
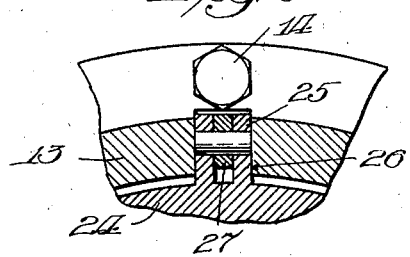
Inventor:
Percy H. Batten
by Davis, Lindsey, Smith & Shonts
Attys.

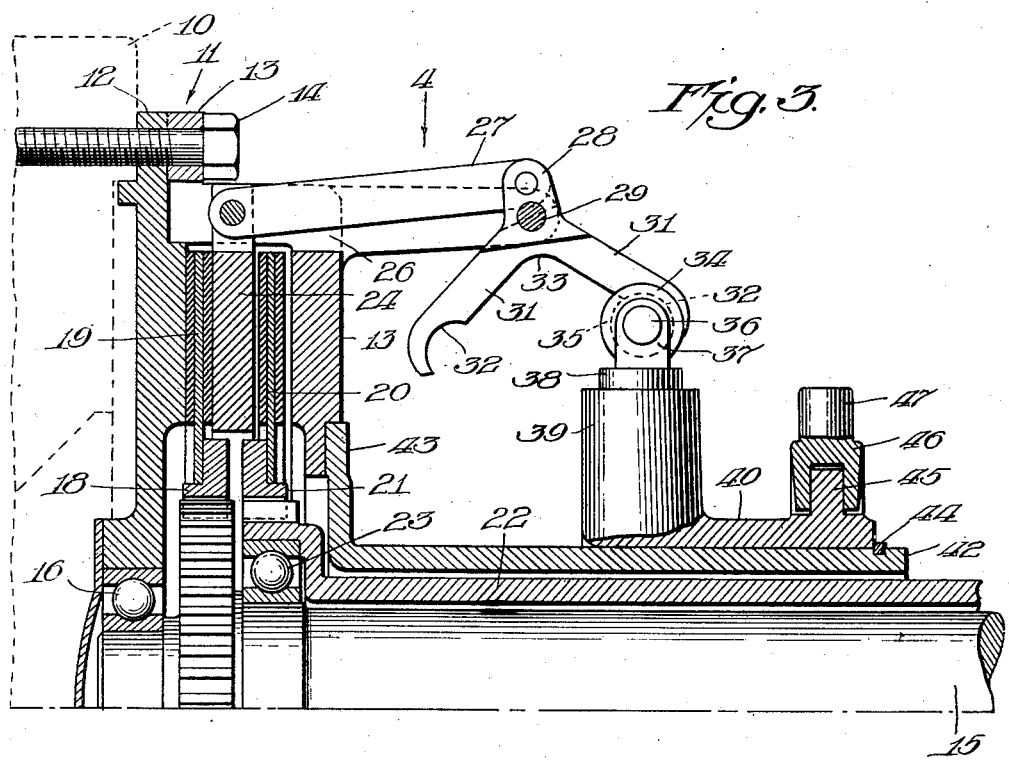

Patented Dec. 19, 1939

2,184,135

UNITED STATES PATENT OFFICE 2,184,135

CLUTCH MECHANISM

Percy H. Batten, Racine, Wis., assignor to Twin Disc Clutch Company, Racine, Wis., a corporation of Wisconsin Application January 21, 1938, Serial No. 186,048

9 Claims. (Cl. 192—48)

My invention relates to a clutch mechanism for effecting a transmission of power between driving and driven shafts and is more particularly concerned with providing a mechanism of this character of the spring-loaded type.

The present invention is a modification of that disclosed and claimed in United States Letters Patent No. 2,127,713, dated August 23, 1938. As in the indicated application, the present structure includes a pair of clutches having a common clamping plate which is spring-loaded when either clutch is engaged, the clutch elements including the plate being preferably mounted in an enclosing casing to thereby permit the use of dry clutches. A further similarity resides in the fact that the clutches are held in their respective driving positions merely by shifting the clamping plate into either operating position and that the plate is also held in neutral position by the loading springs.

The principal object of this invention is to provide a different type of operating means for engaging either clutch and for applying spring pressure to the clamping plate, the general arrangement being such that a reduction in the number of parts and an improvement in the structural complexity are effected.

These and further objects of my invention will be set forth in the following specification, reference being had to the accompanying drawings, and the novel means by which said objects are effectuated will be definitely pointed out in the claims.

In the drawings:

Fig. 2 is an end elevation of the mechanism, partly in section, as viewed in the direction of the arrow 2 in Fig. 1.

Fig. 3 is a fragmentary, sectional elevation of the mechanism illustrated in Fig. 1, showing the positions of the clutch devices and one operator therefor when one of the clutches is engaged.

Fig. 4 is a plan view of the mechanism, partly in section, as viewed in the direction of the arrow 4 in Fig. 3.

Fig. 5 is a section along the line 5—5 in Fig. 1, looking in the direction of the arrows, and showing the pivotal mounting of one of the operating levers and the relation of the actuating roller thereto.

Fig. 6 is a section along the line 6—6 in Fig. 1, looking in the direction of the arrows, and showing the driving connection between the clutch casing and the clamping plate and also the pivotal connection of the operating link to the plate.

Figure 1:
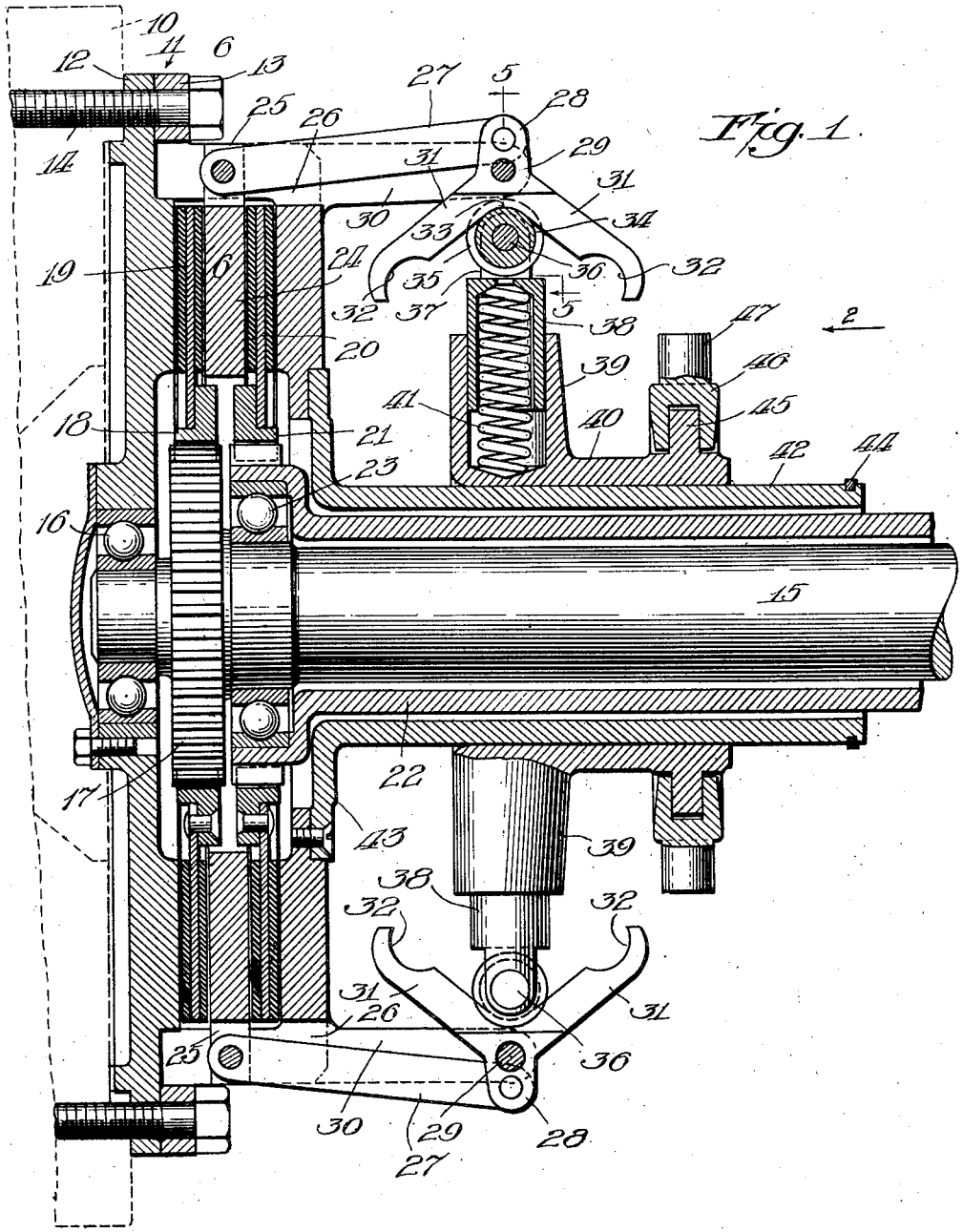
Figure 1 is a sectional elevation of my improved clutch mechanism as viewed along the line 1—1 in Fig. 2, looking in the direction of the arrows, the common clamping plate for the clutches being shown in neutral position.

Referring to Fig. 1, the numeral 10 designates in dotted outline a driving member, such as a flywheel or other part, which is suitably connected to a power source (not shown). A clutch casing 11 composed of the separable, complementary parts 12 and 13 is secured to one face of the flywheel by bolts 14. It will be understood, however, that the direction of drive through the mechanism hereinafter described may be reversed without disturbing the operative relation of the several components of the mechanism. Accordingly, designation of the flywheel 10 or the clutch casing 11 as being a driving element, is intended by way of example only.

One end of a driven shaft 15 is journaled in a bearing 16 carried by the casing part 12 and located in axial alignment with the axis of the flywheel, while the opposite end of the shaft may be appropriately supported as generally indicated in the above noted patent or in any other manner. The shaft is provided with an externally toothed, annular flange 17 that is in constant mesh with similar teeth provided on the inner periphery of a ring 18 to which is secured a friction disc 19 whose opposite faces may be provided with suitable friction material. The disc 19 is located adjacent the inner face of the casing part 12 and a similar friction disc 20 is located adjacent the inner face of the casing part 13. The disc 20 is secured to a ring 21 whose inner periphery has toothed driving engagement with a driven sleeve 22 that surrounds and is concentric with the shaft 15. The sleeve is supported entirely clear of the shaft by means of a bearing 23 at one end that is carried by the shaft 15 and at the opposite end by any suitable means (not shown).

The shaft 15 and sleeve 22 might be regarded as elements for transmitting direct and reverse drives, respectively, in a marine reverse gear installation, such as is more particularly illustrated and described in the aforesaid patent, or they may be connected to a pair of separate mechanisms which it is desired to selectively operate by engaging either clutch. These two clutches are respectively constituted by the clutch part 12 and friction disc 19, and the clutch part 13 and friction disc 20. Engagement of these clutches, respectively, is accomplished by means of a common clamping member or plate 24 which is located between the discs 19 and 20. Driving engagement between the plate and the clutch casing is provided by a plurality of circumferentially spaced lugs 25 which extend outwardly from the periphery of the plate through similarly spaced slots 26 cut in the annular wall of the clutch part 13. In the present construction, these clutches are of the dry plate type as permitted by the use of the enclosed clutch casing, but the mechanism may also be designed to provide for an operation of these clutches in oil spay or a dipping in oil, as circumstances may require.

As shown in Fig. 1, the clutches are occupying a neutral position and the distance between the opposed faces of the casing parts 12 and 13 is such that, when the clamping plate is occupying the intermediate position shown, the friction discs 19 and 20 may freely shift endwise to occupy positions out of contact with the faces of the plate 24 and the casing parts 12 and 13.

The engagement of the clutches is effected through a plurality of operators which are equispaced around the shaft 15 and, since each of the operators is identical in construction, it will only be necessary to describe one of them in detail. As many of these operators may be employed as circumstances require and, in the present instance, for example, four of these operators are shown.

Still referring to Fig. 1, the driving lug 25 is intermediately slotted to pivotally receive one end of a link 27 that extends towards the right, as viewed in said figure, through the slot 26 for pivotal connection to one arm of a lever 28 that is pivoted on a pair of opposed pins 29 carried respectively by the ends of a pair of bracket arms 30 that are preferably integrally formed with the casing part 13. Radially inward of the pins 29, the lever 28 is formed with a pair of divergent arms 31 which are symmetrically disposed on opposite sides of a line passing through the axes of the pivot pins 29. The inner edge face of each arm 31 is smooth and continuous and adjacent the end thereof merges into an arcuate recess 32 for a purpose presently explained. Further, the junction of the edge faces of the arms 31 is also curved, as indicated by the numeral 33, to accommodate the surface of a roller 34.

This roller has a peripheral groove 35 and is positioned between the arms 31 so that the inner faces of either arm may bear against the bottom of the groove as the mechanism is operated, and thus establish a definite guiding relation between the arms and the roller when the latter is shifted. The roller is freely rotatable on a pin 36 that is bridged between a pair of ears 37 extending outwardly, relative to the axis of the mechanism, from a hollow plunger 38. This plunger is reciprocable in a hollow, radial arm 39 carried by a shiftable sleeve 40. A loading spring 41 is interposed between the opposite ends of the plunger and arm 39 and at all times acts to maintain the roller 34 in contact with some portion of either of the arms 31, or in the intermediate position as illustrated in Fig. 1, dependent upon the position of the sleeve 40.

The sleeve 40 is slidable along a tubular extension 42 having at one end an annular flange 43 which may be fastened to the casing part 13. This extension is supported entirely clear of the sleeve 22 and endwise movement of the sleeve 40 towards the left is limited by contact of the radial arm 39 with the flange 43 and in the opposite direction by a stop ring 44 mounted on the extension. In order to shift the sleeve 40 along the extension, the sleeve is provided with an annular flange 45 which is received within an annular groove provided in an operating collar 46 having the usual trunnions 47 for engagement with a shifting fork (not shown).

In describing the operation of my improved clutch mechanism, reference will be had more particularly to Figs. 1 and 3. Referring to Fig. 1, it will be assumed that the flywheel 10 and hence the clutch casing 11 are rotating at some determined speed and that the clamping plate 24 occupies the neutral position shown. In this position, the roller 34 is seated in the curved portion 33 of the lever. At this time, the spring 41 is under minimum compression, but exerts sufficient pressure against the plunger 38 to maintain the roller and hence the clamping plate in the position illustrated in Fig. 1.

If now it is desired to transmit a drive to the shaft 15, the sleeve 40 is shifted along the extension 42 towards the right, as viewed in Figs. 1 and 3, thus causing the roller 34 to traverse the right arm 31 of the operating lever 28 and effecting a counterclockwise rotation of this lever about its pivot and moving the clamping plate 24 to grip the friction disc 19 against the casing part 12, thereby providing a drive connection between the shaft 15 and the flywheel 10.

The shifting of the sleeve 40 ordinarily continues until the roller 34 seats in the right-hand recess 32 and, at this time, the operator occupies the position substantially as illustrated in Fig. 3. In this position, the roller and the attached plunger 38 have been shifted radially inward to further compress the spring 41 and the reaction therefrom provides the required spring loading on the clamping plate 24. The recess 32 provides a lock for the roller 34 and, in conjunction with the spring 41, maintains this roller and the associated part in the position to which it has been moved.

The sleeve 40 and the parts carried thereby, including the roller 34, operates substantially as a wedge in engaging either clutch, due to the straight-line movement of the sleeve, i. e., in an endwise direction. This arrangement also provides for automatic compensation for wear of the friction facings on the discs 19 and 20, since within the range of movement of the several parts, the springs automatically take up wear in the facings.

The manner of engaging the clutch comprising the casing part 13 and the disc 20 is exactly the same as that already described, except that the sleeve 40 is moved toward the left from the position illustrated in Fig. 1 until the roller 34 is seated in the left-hand recess 32, the lever 28 therefore rotating in a clockwise direction to shift the clamping plate 24 towards the right.

The foregoing mechanism may be embodied in an arrangement that is quite compact and in which the loading springs for the respective clutches are utilized to maintain either clutch in driving engagement and also the common clamping plate therefor in neutral position. Moreover, because the respective clutches are engaged by the simple operation of bodily shifting the operators from one position to another, the clutches may be thrown into engagement free of any tendency to grab or jerk. For any given endwise movement of the sleeve 40, any desired endwise movement of the clamping plate 24 may be effected by appropriately relating the angularity of the lever arms 31. Finally, while clutches employing single friction plates have been illustrated, it will be understood that the invention is also capable of adaptation to multiple disc clutches.

I claim:

1. In clutch mechanism, the combination of clutch devices connected to separate rotary parts, a clamping member connected to one of the devices and shiftable to drivably connect both devices, a plurality of levers pivoted on one of the devices and each lever being connected to the member, a shiftable sleeve, a plurality of plungers slidably and independently mounted on the sleeve and each having a roller for contacting an arm of a lever, springs abutting on the sleeve and acting to maintain the rollers in contact with the respective arms, each arm being angularly disposed to the thrusting direction of the associated roller to thereby load the spring as the sleeve is shifted in a direction to rock the levers and engage the devices.

2. In clutch mechanism, the combination of clutch devices connected to separate rotary parts, a clamping member connected to one of the devices and shiftable to drivably connect both devices, a lever pivoted on one of the devices and connected to the member, shiftable wedge-acting means having a spring-actuated element for engaging an arm of the lever, the arm being angularly disposed to the thrusting direction of the element to thereby load the element as the means is shifted in a direction to rock the lever and engage the devices, and a formation on the lever interlocking with the element to hold the devices in engaged position.

3. In clutch mechanism, the combination of clutch devices connected to separate rotary parts, a clamping member connected to one of the devices and shiftable to drivably connect both devices, a lever pivoted on one of the devices and connected to the member, shiftable wedge-acting means having a spring-actuated element for engaging an arm of the lever, the arm being angularly disposed to the thrusting direction of the element to thereby load the element as the means is shifted in a direction to rock the lever and engage the devices, and formations on the lever interlocking with the element to hold the member in engaged or neutral position.

4. In clutch mechanism, the combination of clutch devices connected to separate rotary parts, a clamping member connected to one of the devices and shiftable to drivably connect both devices, a lever pivoted on one of the devices and connected to the member, a shiftable sleeve, a plunger slidably mounted on the sleeve and having a roller for contacting an arm of the lever, a spring abutting on the sleeve and acting to maintain the roller in contact with the arm, the arm being angularly disposed to the thrusting direction of the roller to thereby load the spring as the sleeve is shifted in a direction to rock the lever and engage the devices, the arm including an arcuate recess for lockingly engaging the periphery of the roller when the devices are engaged.

5. In a clutch mechanism, the combination of a pair of clutches, a clamping member common to both clutches and shiftable to engage either clutch, a lever having a pair of divergent arms pivoted on an element forming a part of each clutch and connected to the member, a shiftable sleeve, a plunger slidably mounted on the sleeve and having a roller for contacting either arm of the lever, a spring abutting on the sleeve and acting to maintain the roller in contact with either arm, both arms being angularly disposed to the thrusting direction of the roller to thereby load the spring as the sleeve is shifted in either direction to rock the lever and engage the associated clutch.

6. In clutch mechanism, the combination of a pair of clutches, a clamping member common to both clutches and shiftable to engage either clutch, a lever having a pair of divergent arms pivoted on an element forming a part of each clutch and connected to the member, a shiftable sleeve, a plunger slidably mounted on the sleeve and having a roller for contacting either arm of the lever, a spring abutting on the sleeve and acting to maintain the roller in contact with either arm, both arms being angularly disposed to the thrusting direction of the roller to thereby load the spring as the sleeve is shifted in either direction to rock the lever and engage the associated clutch, each arm including an arcuate recess for lockingly receiving the roller when the associated clutch is engaged.

7. In a clutch mechanism, the combination of a pair of clutches, a clamping member common to both clutches and shiftable to engage either clutch, a lever having a pair of divergent arms pivoted on an element forming a part of each clutch and connected to the member, a shiftable sleeve, a plunger slidably mounted on the sleeve and having a roller for contacting either arm of the lever, a spring abutting on the sleeve and acting to maintain the roller in contact with either arm, both arms being angularly disposed to the thrusting direction of the roller to thereby load the spring as the sleeve is shifted in a direction to rock the lever and engage the associated clutch, and each arm including an arcuate recess for lockingly engaging the roller to hold the associated clutch in engaged position and the junction of the lever arms being curved to lockingly engage the roller to maintain the clamping plate in neutral position.

8. In clutch mechanism, the combination of clutch devices connected to separate rotary parts, an actuating member rotarily connected to one of the devices and operative to drivably connect both devices, a lever pivoted on one of the devices and connected to the member, shiftable wedge-acting means having a slidable element for engaging an arm of the lever, and a spring interposed between the element and a rigid base forming a part of the means and acting to continuously press the element against the arm, the arm being angularly disposed to the thrusting direction of the element to thereby load the same as the means is shifted in a direction to rock the lever and engage the devices.

9. In clutch mechanism, the combination of a pair of clutches, a clamping member common to both clutches and shiftable to engage either clutch, a lever having a pair of divergent arms pivoted on an element forming a part of each clutch and connected to the member, shiftable wedge-acting means having a slidable element for engaging either arm, and a spring interposed between the element and a rigid base forming a part of the means and acting to continuously press the element against either arm, both arms being angularly disposed to the thrusting direction of the element to thereby load the element as the means is shifted in either direction to rock the lever and engage the associated clutch.

PERCY H. BATTEN.